United States Patent
Shibata

(10) Patent No.: US 11,363,204 B2
(45) Date of Patent: Jun. 14, 2022

(54) IMAGE PROCESSING APPARATUS, IMAGE CAPTURE APPARATUS, AND IMAGE PROCESSING METHOD

(71) Applicant: CANON KABUSHIKI KAISHA, Tokyo (JP)

(72) Inventor: Masahiro Shibata, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/201,063

(22) Filed: Mar. 15, 2021

(65) Prior Publication Data
US 2021/0297597 A1 Sep. 23, 2021

(30) Foreign Application Priority Data

Mar. 17, 2020 (JP) .............................. JP2020-046839

(51) Int. Cl.
*H04N 5/232* (2006.01)
*G06T 5/00* (2006.01)
*G06T 3/00* (2006.01)

(52) U.S. Cl.
CPC ....... *H04N 5/23287* (2013.01); *G06T 3/0006* (2013.01); *G06T 5/003* (2013.01); *H04N 5/23254* (2013.01); *G06T 2207/20201* (2013.01)

(58) Field of Classification Search
CPC .......... H04N 5/23287; H04N 5/23254; H04N 5/23267; H04N 5/23258; G06T 5/003; G06T 3/0006; G06T 2207/20201

USPC .................................................... 348/208.11
See application file for complete search history.

(56) References Cited

U.S. PATENT DOCUMENTS

| | | | | |
|---|---|---|---|---|
| 5,673,086 A | * | 9/1997 | Fukuoka | H04N 5/23293 |
| | | | | 348/E7.003 |
| 5,696,560 A | * | 12/1997 | Songer | H04N 5/765 |
| | | | | 348/478 |
| 7,148,947 B2 | * | 12/2006 | Miyagishima | G11B 7/0032 |
| 10,539,764 B2 | * | 1/2020 | Sasaki | G06T 5/20 |
| 10,546,395 B2 | * | 1/2020 | Yu | H04N 5/232 |
| 11,086,109 B2 | * | 8/2021 | Sasaki | G02B 13/08 |
| 11,159,722 B2 | * | 10/2021 | An | H04N 5/23258 |
| 11,237,400 B2 | * | 2/2022 | Sasaki | G02B 13/08 |
| 2005/0212931 A1 | * | 9/2005 | Gallagher | H04N 5/23254 |
| | | | | 348/E5.046 |

(Continued)

FOREIGN PATENT DOCUMENTS

JP 2018-156036 A 10/2018

*Primary Examiner* — Pritham D Prabhakher
(74) *Attorney, Agent, or Firm* — Cowan, Liebowitz & Latman, P.C.

(57) ABSTRACT

An image processing apparatus that corrects image blurring with respect to image data that has been captured using a lens that forms a subject image which has been compressed in at least one of first and second directions that are orthogonal to an optical axis is disclosed. The apparatus applies geometric transformation processing to the image data based on first information related to a compression ratio of a subject image applied by the lens and on second information related to a rotation angle of the device motion. The geometric transformation processing includes correction processing for rotation transformation of the subject image attributed to the device motion around the optical axis, and shearing processing.

16 Claims, 6 Drawing Sheets

(56) References Cited

U.S. PATENT DOCUMENTS

| | | | |
|---|---|---|---|
| 2014/0184836 A1* | 7/2014 | Watanabe | H04N 5/23254 |
| | | | 348/208.5 |
| 2016/0253824 A1* | 9/2016 | Yu | H04N 5/232 |
| | | | 348/46 |
| 2019/0011679 A1* | 1/2019 | Sasaki | G06T 5/20 |
| 2020/0228709 A1* | 7/2020 | An | H04N 5/23258 |
| 2020/0326516 A1* | 10/2020 | Sasaki | G06T 5/20 |

* cited by examiner

IMAGE PROCESSING APPARATUS, IMAGE CAPTURE APPARATUS, AND IMAGE PROCESSING METHOD

BACKGROUND OF THE INVENTION

Field of the Invention

The present invention relates to an image processing apparatus, image capture apparatus, and an image processing method. The present invention especially relates to a technique to correct an image that has been shot using a special lens.

Description of the Related Art

Conventionally, in order to shoot an image that has a different aspect ratio from an image sensor while making effective use of a pixel region of the image sensor, a special photographing lens that forms a subject optical image that has been transformed or compressed in a certain direction is used in some cases. For example, an anamorphic lens forms a subject optical image that has been compressed to ½ or 1/1.33 in the horizontal direction. An anamorphic video with an aspect ratio of, for example, 2.39:1 can be obtained by shooting with an anamorphic lens mounted on an image capturing apparatus that includes an image sensor with a commonly-used aspect ratio of 4:3, and by enlarging the result of shooting in the horizontal direction at the time of reproduction.

In an image capture apparatus equipped with a special lens that forms an optical image that has been compressed or transformed in a certain direction in the above-described manner, there is a problem that accurate correction cannot be performed if image blurring correction is performed similarly to the case where the image capture apparatus is equipped with a normal lens. For this reason, Japanese Patent Laid-Open No. 2018-156036 prohibits correction of image blurring associated with rotation about an optical axis when an anamorphic lens is mounted.

Conventional techniques cannot correct image blurring associated with rotation about an optical axis when an anamorphic lens is mounted, and thus have a problem that the capability to correct image blurring is reduced.

SUMMARY OF THE INVENTION

The present invention has been made in view of the foregoing problem with conventional techniques. The present invention, in an aspect thereof, provides an image processing apparatus and an image processing method that can correct image blurring associated with rotation about an optical axis with respect to an image that has been shot using a special lens that forms an optical image that has been compressed in a certain direction.

According to an aspect of the present invention, there is provided an image processing apparatus that corrects image blurring with respect to image data that has been captured using a lens that forms a subject image which has been compressed in at least one of a first direction and a second direction that are orthogonal to an optical axis and in which compression in the first direction is larger than compression in the second direction, the image blurring being attributed to a device motion around the optical axis of the lens, the image processing apparatus comprising: an image transformation circuit that applies geometric transformation processing to the image data based on first information related to a compression ratio of a subject image applied by the lens and on second information related to a rotation angle of the device motion, wherein the geometric transformation processing includes correction processing for rotation transformation of the subject image attributed to the device motion around the optical axis, and shearing processing.

According to another aspect of the present invention, there is provided an image capture apparatus, comprising: an image sensor; a motion detection circuit that outputs a signal indicating a motion of the image capture apparatus, and an image processing apparatus that corrects image blurring with respect to image data that has been captured using the image sensor and a lens that forms a subject image which has been compressed in at least one of a first direction and a second direction that are orthogonal to an optical axis and in which compression in the first direction is larger than compression in the second direction, the image blurring being attributed to the motion of the image capture apparatus around the optical axis of the lens, wherein the image processing apparatus applies geometric transformation processing to the image data based on first information related to a compression ratio of a subject image applied by the lens and on second information related to a rotation angle of the motion of the image capture apparatus, and obtains the second information from the motion detection circuit.

According to a further aspect of the present invention, there is provided an image processing method executed by an image processing apparatus that corrects image blurring with respect to image data that has been captured using a lens that forms a subject image which has been compressed in at least one of a first direction and a second direction that are orthogonal to an optical axis and in which compression in the first direction is larger than compression in the second direction, the image blurring being attributed to a device motion around the optical axis of the lens, the image processing method comprising: applying geometric transformation processing to the image data based on first information related to a compression ratio of a subject image applied by the lens and on second information related to a rotation angle of the device motion, wherein the applying includes applying correction processing for rotation transformation of the subject image attributed to the device motion around the optical axis, and applying shearing processing.

Further features of the present invention will become apparent from the following description of exemplary embodiments (with reference to the attached drawings).

DESCRIPTION OF THE EMBODIMENTS

Figure 1:
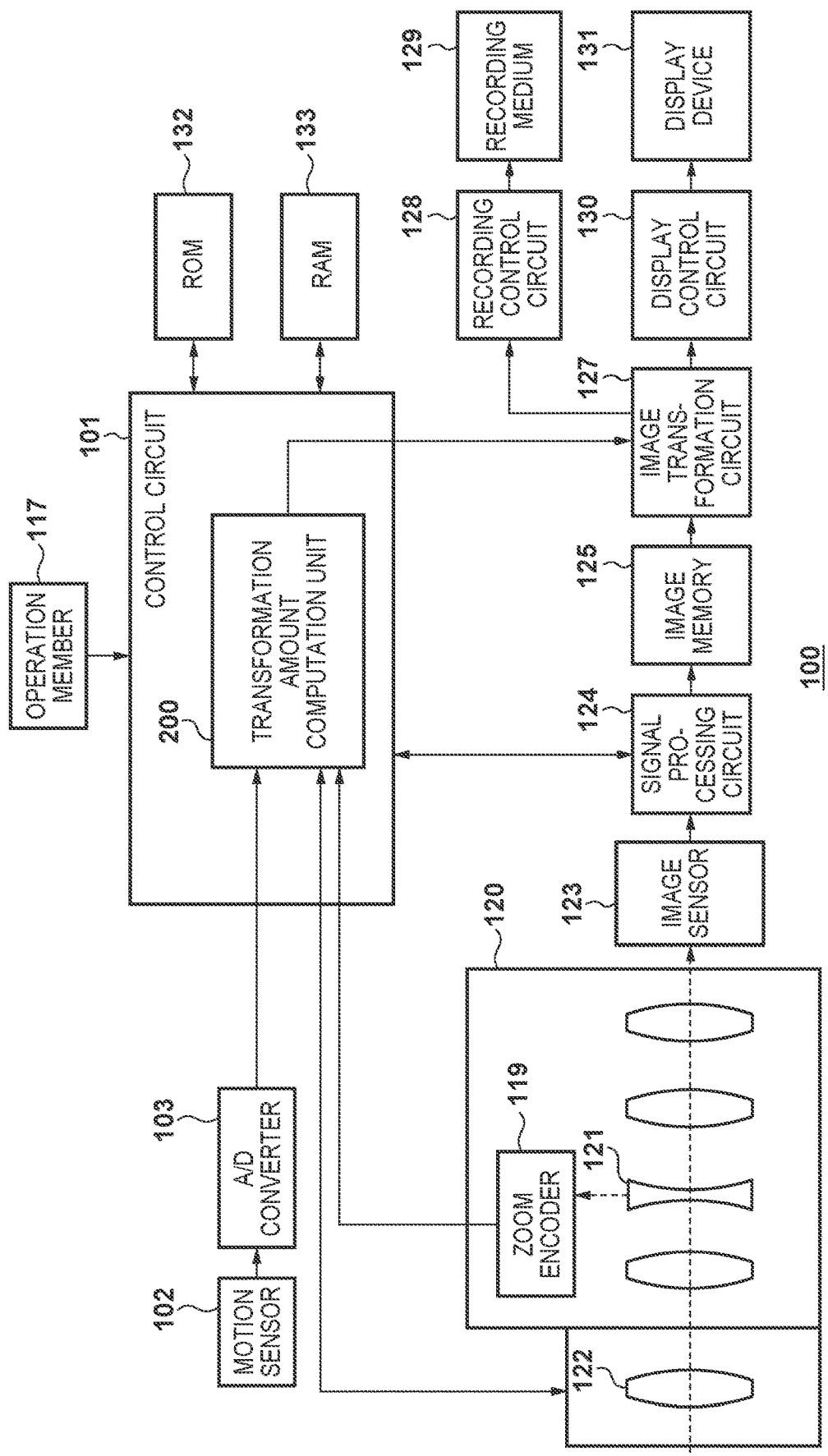
FIG. 1 is a block diagram showing an exemplary configuration of a video camera as one example of an image capture apparatus according to an embodiment.

The following describes an embodiment in detail with reference to the attached drawings. Note that the following embodiment does not limit the invention of the claims. While the embodiment describes a plurality of features, not all of these features are essential for the invention, and furthermore, the plurality of features may be arbitrarily combined. Moreover, the same reference numerals denote the same or like constituents in the attached drawings, and duplicate explanations are omitted.

Note that a constituent that is represented as a block in the drawings can be realized by an integrated circuit (IC), such as an ASIC and an FPGA, by a discrete circuit, or by a combination of a memory and a processor that executes a program stored in the memory. Also, one block may be realized by a plurality of integrated circuit packages, and a plurality of blocks may be realized by one integrated circuit package. Furthermore, the same block may be implemented as different constituents depending on an operating environment, a required capability, and so on.

The following embodiment will be described in relation to a case where the present invention is implemented on a digital video camera. However, an image capture function is not indispensable for the present invention, and the present invention can be implemented on any electronic device capable of image processing. Examples of such an electronic device include a video camera, a computer device (e.g., a personal computer, a tablet computer, a media player, and a PDA), a mobile telephone device, a smartphone, a game device, a robot, a drone, and a driving recorder. These are examples, and the present invention can be implemented on other electronic devices.

Figure 5A:
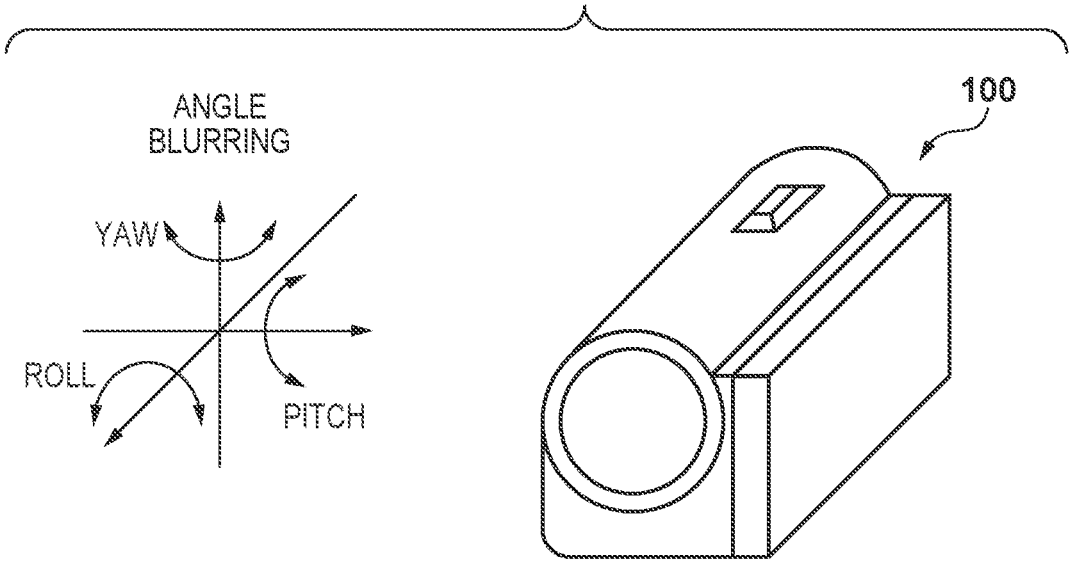
FIG. 5A and FIG. 5B are diagrams related to a device motion.
Figure 5B:
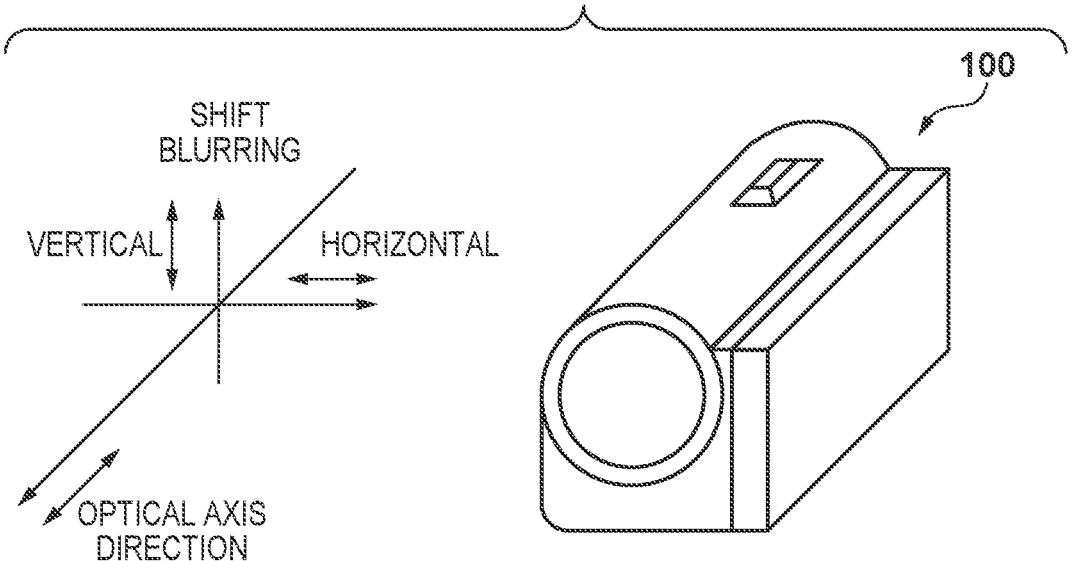
Figure 6A:
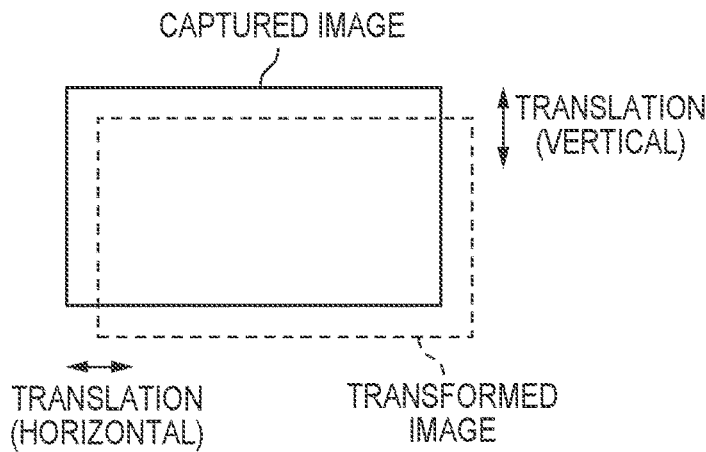
FIG. 6A to FIG. 6F are diagrams related to image blurring.
Figure 6B:
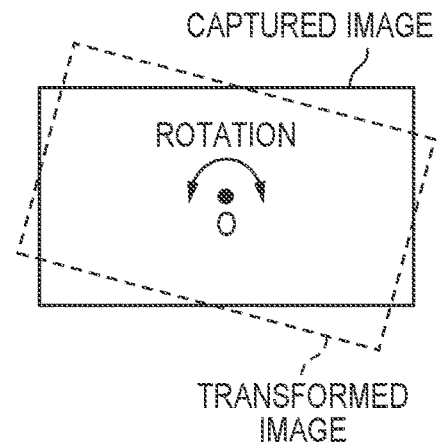
Figure 6C:
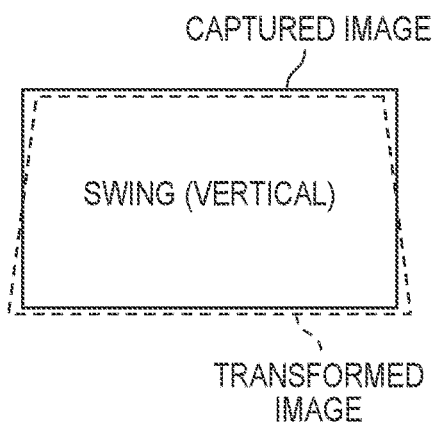
Figure 6D:
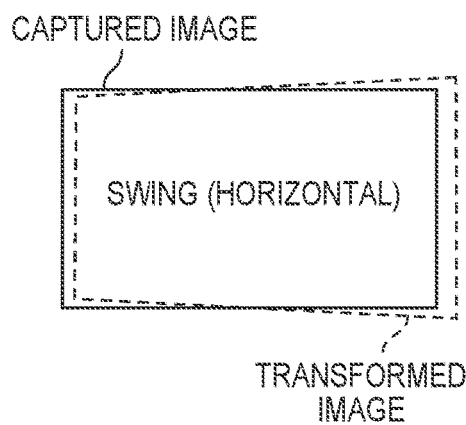
Figure 6E:
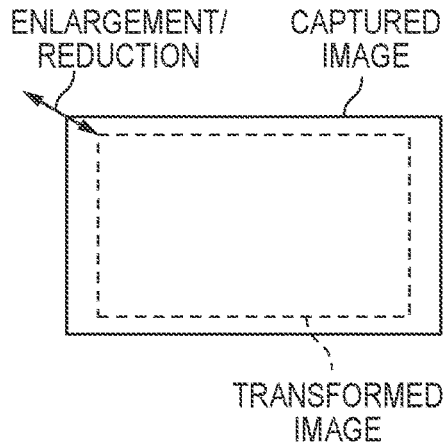
Figure 6F:
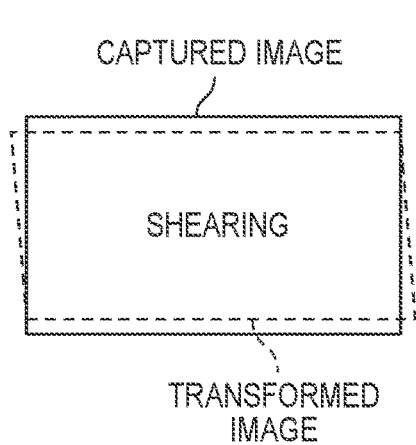

First, the definitions of terms used in the present specification will be described. In the present specification, a motion of an image capture apparatus is referred to as a "device motion", and transformation of a captured image caused by a device motion is referred to as "image blurring". As shown in FIG. 5A and FIG. 5B, a "device motion" includes three types of "angle blurring" in the yaw, pitch, and roll directions, and three types of "shift blurring" in the horizontal, vertical, and optical axis directions. A "device motion" with no designated direction is a general term for these six types of direction components related to a motion of the apparatus. Furthermore, "image blurring" with no designated direction is a general term for eight types of image transformation shown in FIG. 6A to FIG. 6F, which are: translation (horizontal and vertical), rotation, swinging (horizontal and vertical), enlargement, reduction, and shearing.

FIG. 1 is a block diagram showing an exemplary functional configuration of a digital video camera 100 (hereinafter simply referred to as a video camera 100) as one example of an image processing apparatus according to an embodiment of the present invention. It should be noted that FIG. 1 only illustrates constituents that are necessary for the description of the embodiment among constituents included in the video camera 100.

A control circuit 101 is, for example, a CPU, and realizes the functions of the video camera 100 by, for example, reading a program stored in a ROM 132 into a RAM 133, executing the program, and controlling respective components of the video camera 100. The ROM 132 is, for example, a rewritable, nonvolatile memory, and stores the program that can be executed by the CPU of the control circuit 101, setting values, GUI data, and so forth. The RAM 133 is used to read the program executed by the CPU of the control circuit 101, and to store necessary values during the execution of the program.

Note that in FIG. 1, a transformation amount computation circuit 200 is illustrated as a function block that has functions related especially to the embodiment among the functions realized by the control circuit 101 executing the program.

A motion sensor 102 outputs a motion signal indicating a device motion, which is a motion of the image capture apparatus 100. The motion sensor 102 may be, for example, a triaxial angular velocity sensor. Note that shift blurring may be detected by a triaxial acceleration sensor.

An A/D converter 103 applies A/D conversion to the motion signal output from the motion sensor 102, and supplies the resultant motion signal to the control circuit 101. Note that when the motion sensor 102 outputs the motion signal in a digital format, the A/D converter 103 is unnecessary.

An image capture optical system 120 has a lens assembly, which includes such movable lenses as a varifocal lens 121 and a focus lens, and a diaphragm, and forms a subject image on an image plane of an image sensor 123. The image sensor 123 includes a pixel array in which pixels including photoelectric conversion units are arranged two-dimensionally. The image sensor 123 converts the subject image formed on the image plane into a group of analog pixel signals (analog image signals) with use of the pixel array, and outputs the group of analog pixel signals to a signal processing circuit 124. The operations of the image sensor 123 are controlled by the control circuit 101.

In the present embodiment, an anamorphic lens 122 is removably attached to an end of the image capture optical system 120 closer to a subject. The anamorphic lens 122 is an optical system that has an advantageous effect whereby the subject image is compressed in one specific direction (which is assumed here to be the direction parallel to the long sides of the pixel array in the image sensor 123). The anamorphic lens 122 is one example of a lens that forms a rotationally asymmetric image (forms the subject image in a compressed state). Note that the image capture optical system 120 may be interchangeable, or may be fixed to the video camera 100. Furthermore, the anamorphic lens 122 may be attachable to and removable from the image capture optical system 120, or may be built in the image capture optical system 120. Hereinafter, regardless of the form of the anamorphic lens 122, a state where the subject image formed on the image sensor 123 has been compressed in one specific direction is referred to as a state where the anamorphic lens is mounted on the video camera 100.

A zoom encoder 119 detects the position of the varifocal lens 121 (zoom position), and outputs the detected position to the control circuit 101 (transformation amount computation circuit 200). Furthermore, the image capture optical system 120 also outputs the position of the focus lens and the f-number to the control circuit 101, similarly to the zoom position. The control circuit 101 controls the focal length (angle of view) and the focus distance of the image capture optical system 120 by controlling the positions of the varifocal lens 121 and the focus lens.

An operation member 117 is a general term for input devices (e.g., buttons, switches, and dials) that are provided to allow a user to input various types of instructions to the video camera 100. A user operation on the operation member 117 is detected by the control circuit 101. The input devices that compose the operation member 117 have names that correspond to the functions allocated thereto. For example, the operation member 117 includes a release switch, a moving image recording switch, a shooting mode selection dial for selecting a shooting mode, a menu button, direction keys, a determination key, and so forth. The release switch is a switch for recording a still image, and the control circuit 101 recognizes a state where the release switch is depressed halfway as a shooting preparation instruction, and a state where the release switch is fully depressed as a shooting start instruction. Also, the control circuit 101 recognizes depression of a moving image recording switch in a shooting standby state as a recording start instruction for moving images, and recognizes depression of the moving image recording switch during the recording of moving images as a recording stop instruction. Note that the functions allocated to the same input device may be variable. Furthermore, the input devices may be software buttons or keys that use a touch display. In addition, the operation member 117 may include an input device that supports a contactless input method, such as voice input and eye-tracking input.

The signal processing circuit 124 applies preset image processing to the analog image signals from the image sensor 123 to generate signals and image data, as well as to obtain and/or generate various types of information. The signal processing circuit 124 may be, for example, a dedicated hardware circuit, such as an ASIC, designed to realize a specific function, or may be configured to realize a specific function through the execution of software by a programmable processor, such as a DSP. Furthermore, at least a part of the functions of the signal processing circuit 124 may be realized by the control circuit 101 executing the program.

The image processing applied by the signal processing circuit 124 here includes preprocessing, color interpolation processing, correction processing, data editing processing, evaluation value calculation processing, special effects processing, and so forth. The preprocessing includes A/D conversion, signal amplification, base level adjustment, defect pixel correction, and so forth. The color interpolation processing is processing for interpolating values of color components that are not included in image data that has been read out from pixels, and is also referred to as demosaicing processing and synchronization processing. The correction processing includes white balance adjustment, gradation correction (gamma processing), processing for correcting the influence of optical aberration and vignetting of the image capture optical system 120, color correction processing, and so forth. The data editing processing includes composition processing, scaling processing, encoding and decoding processing, header information generation processing, and so forth. The evaluation value calculation processing denotes generation of signals and evaluation values used in automatic focus detection (AF), processing for calculating evaluation values used in automatic exposure control (AE), and so forth. The special effects processing includes addition of blurring, changing of tones, relighting processing, and so forth. Note that these are examples of the image processing that can be applied by the signal processing circuit 124, and do not limit the image processing applied by the signal processing circuit 124.

At the time of shooting of moving images, the signal processing circuit 124 generates pieces of frame image data by applying the image processing to the analog image signals that are output from the image sensor 123 at a predetermined frame rate, and sequentially writes the pieces of frame image data to an image memory 125.

An image transformation circuit 127 corrects image blurring by applying geometric transformation processing to image data stored in the image memory 125 based on the image transformation amount calculated by the transformation amount computation circuit 200. The details of the operations of the image transformation circuit 127 will be described later. When image blurring correction is not to be performed due to, for example, the settings, the image transformation circuit 127 does not apply the geometric transformation processing.

Image data output from the image transformation circuit 127 is output to a recording control circuit 128 and a display control circuit 130. Note that development processing, scaling processing, encoding processing, and the like may be necessary for use in recording and display, depending on the format of frame image data that is written by the signal processing circuit 124 to the image memory 125. In this case, the signal processing circuit 124 may apply necessary processing to image data output from the image transformation circuit 127, and then the resultant image data may be output to the recording control circuit 128 and the display control circuit 130. Alternatively, the recording control circuit 128 and the display control circuit 130 may generate image data for recording and image data for display, respectively, from image data supplied from the image transformation circuit 127.

The display control circuit 130 includes a video memory (VRAM), and supplies signals based on image data for display, which is stored in the video memory, to a display device 131. The image data for display may be image data supplied from the image transformation circuit 127 or the signal processing circuit 124, or may be generated by the display control circuit 130 based on image data supplied from the image transformation circuit 127. The display device 131 is, for example, an LCD. The display device 131 may also be a touch display.

The recording control circuit 128 includes a buffer memory, and records an image data file based on image data for recording, which is stored in the buffer memory, to a recording medium 129. The image data for recording may be image data supplied from the image transformation circuit 127 or the signal processing circuit 124, or may be generated by the recording control circuit 128 based on image data supplied from the image transformation circuit 127. The recording medium 129 is, for example, a semiconductor memory card. Note that the recording medium 129 may also be an external recording apparatus. Also note that the recording performed by the recording control circuit 128 is started in response to the user's input of a shooting start instruction (still image) or a recording start instruction (moving images) via the operation member 117.

A description is now given of a method of obtaining information related to the characteristics of the anamorphic lens 122. The characteristics of the anamorphic lens 122 denote, for example, the compression ratio and the compression direction of an optical image, distortion correction information, and the like. Note that as the compression direction of an optical image of the anamorphic lens 122 is basically the direction parallel to the long sides of the pixel array in the image sensor 123, information of the compression direction may be absent.

When the shooting optical system 120 is an interchangeable lens including the anamorphic lens 122, the control circuit 101 can obtain the information related to the characteristics of the anamorphic lens 122 via communication with a control unit included in the shooting optical system 120. On the other hand, when the anamorphic lens 122 is, for example, a conversion lens or an adapter and is thus configured in such a manner that it cannot communicate with the control circuit 101, the user can set the information related to the characteristics of the anamorphic lens 122 by, for example, performing a user operation on the operation member 117. Alternatively, the information may be obtained from an external apparatus via communication by designating, for example, the model number of the anamorphic lens 122. Whatever the obtainment method is, the information related to the characteristics of the anamorphic lens 122 is supplied to the transformation amount computation circuit 200.

The transformation amount computation circuit 200 calculates the image transformation amount indicating the geometric transformation for correcting image blurring with use of the motion signal output from the motion sensor 102, the zoom position output from the zoom encoder 119, and the information related to the characteristics of the anamorphic lens 122. Then, the transformation amount computation circuit 200 sets the calculated image transformation amount on the image transformation circuit 127. The details of processing of the transformation amount computation circuit 200 will be described later.

(Operations of Image Transformation Circuit 127)

The image transformation circuit 127 applies geometric image transformation processing to image data with use of, for example, projective transformation and the like. On a captured image, an orthogonal coordinate system is defined in which image coordinates corresponding to an optical axis of the image capture optical system 120 are used as the origin, and the directions along the long sides and the short sides of the pixel array are used as an X axis and a Y axis, respectively. Also, it is assumed that pixel coordinates in a pre-transformation image stored in the image memory 125 are (X0, Y0), and pixel coordinates in a post-transformation image are (X1, Y1). In this case, the relationship between pre-transformation pixel coordinates and post-transformation pixel coordinates can be denoted as (Expression 1) with use of the homogeneous coordinate representation.

$$\begin{bmatrix} X1 \\ Y1 \\ 1 \end{bmatrix} \sim \begin{bmatrix} h1 & h2 & h3 \\ h4 & h5 & h6 \\ h7 & h8 & 1 \end{bmatrix} \begin{bmatrix} X0 \\ Y0 \\ 1 \end{bmatrix} \quad \text{(Expression 1)}$$

Here, "~" indicates that the left side and the right side of (Expression 1) are in an equivalence relation (the meaning does not change even if the left side or the right side is multiplied by an arbitrary scaling factor). With use of an equality sign, (Expression 1) is represented as the following (Expression 2) and (Expression 3).

$$X1 = \frac{h1 X0 + h2 Y0 + h3}{h7 X0 + h8 Y0 + 1} \quad \text{(Expression 2)}$$

$$Y1 = \frac{h4 X0 + h5 Y0 + h6}{h7 X0 + h8 Y0 + 1} \quad \text{(Expression 3)}$$

Also, the 3×3 matrix in (Expression 1) is generally called a projective transformation matrix, and the transformation amount computation circuit 200 sets the elements h1 to h8 in the matrix as the image transformation amount on the image transformation circuit 127. Note, although it is assumed in the following description that the image transformation circuit 127 realizes geometric transformation with use of projective transformation, it is permissible to use, for example, other known geometric transform methods, such as affine transformation.

(Operations of Transformation Amount Computation Circuit 200)

Next, the details of the operations of the transformation amount computation circuit 200 will be described. The transformation amount computation circuit 200 calculates the image transformation amount with use of the angle of the device motion obtained from the motion signal, the focal length of the image capture optical system 120 obtained from the zoom position, and the information related to the characteristics of the anamorphic lens 122. Specifically, the transformation amount computation circuit 200 calculates the projective transformation matrix of (Expression 1) as the image transformation amount.

In the present embodiment, the transformation amount computation circuit 200 first calculates the projective transformation matrix from the angle of the device motion obtained from the motion signal, and from the focal length of the image capture optical system 120 obtained from the zoom position. Then, the transformation amount computation circuit 200 corrects the projective transformation matrix with use of the information related to the characteristics of the anamorphic lens 122, and sets the corrected projective transformation matrix as the image transformation amount on the image transformation circuit 127.

Figure 2A:
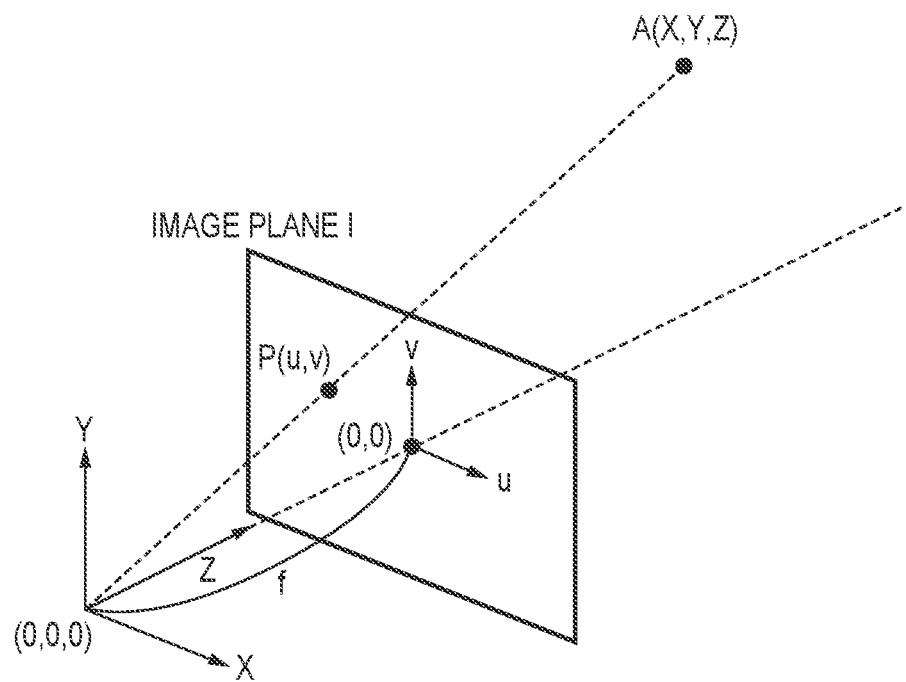
FIG. 2A and FIG. 2B are diagrams illustrating a pinhole camera model.

First, the operation of calculating the projective transformation matrix with use of the angle of the device motion and the focal length of the image capture optical system 120 will be described. FIG. 2A is a perspective view showing how the video camera 100 projects a subject image on the image plane with use of a pinhole camera model. Assume the XYZ spatial coordinates based on the origin (0, 0, 0) represented by the position of a pinhole in the pinhole camera model. If the image plane is arranged behind the pinhole, the subject image projected on the image plane becomes inverted; thus, in FIG. 2A, the image plane I is virtually arranged anterior to the pinhole position (closer to the subject).

The distance between the origin (0, 0, 0) of the XYZ spatial coordinates and the image plane I in the Z-axis direction is equivalent to the focal length f of the image capture optical system 120. With regard to coordinates on the image plane I, a uv plane coordinate system is set in which an intersection between the Z axis of the XYZ coordinate system and the image plane is used as the origin (0, 0). Therefore, the origin of the uv plane coordinate system corresponds to the coordinates (0, 0, f) in the XYZ coordinate system. Note that the X axis and the u axis, as well as the Y axis and the y axis, have the same direction.

In this case, coordinates P (u, v) in the uv plane coordinate system are coordinates obtained by projecting coordinates A (X, Y, Z) of the subject in the XYZ spatial coordinate system onto the image plane I. Therefore, the relationship between coordinates P and coordinates A can be represented as (Expression 4).

$$\begin{bmatrix} u \\ v \end{bmatrix} = \begin{bmatrix} f\frac{X}{Z} \\ f\frac{Y}{Z} \end{bmatrix} \quad \text{(Expression 4)}$$

Using homogeneous coordinates, (Expression 4) can be represented as (Expression 5).

$$\begin{bmatrix} u \\ v \\ 1 \end{bmatrix} \sim \begin{bmatrix} f & 0 & 0 & 0 \\ 0 & f & 0 & 0 \\ 0 & 0 & 1 & 0 \end{bmatrix} \begin{bmatrix} X \\ Y \\ Z \\ 1 \end{bmatrix} \quad \text{(Expression 5)}$$

Here, as the elements in the fourth column of the 3×4 matrix in (Expression 5) are 0, (Expression 5) is the same as (Expression 6).

$$\begin{bmatrix} u \\ v \\ 1 \end{bmatrix} \sim \begin{bmatrix} f & 0 & 0 \\ 0 & f & 0 \\ 0 & 0 & 1 \end{bmatrix} \begin{bmatrix} X \\ Y \\ Z \end{bmatrix} \quad \text{(Expression 6)}$$

Figure 2B:
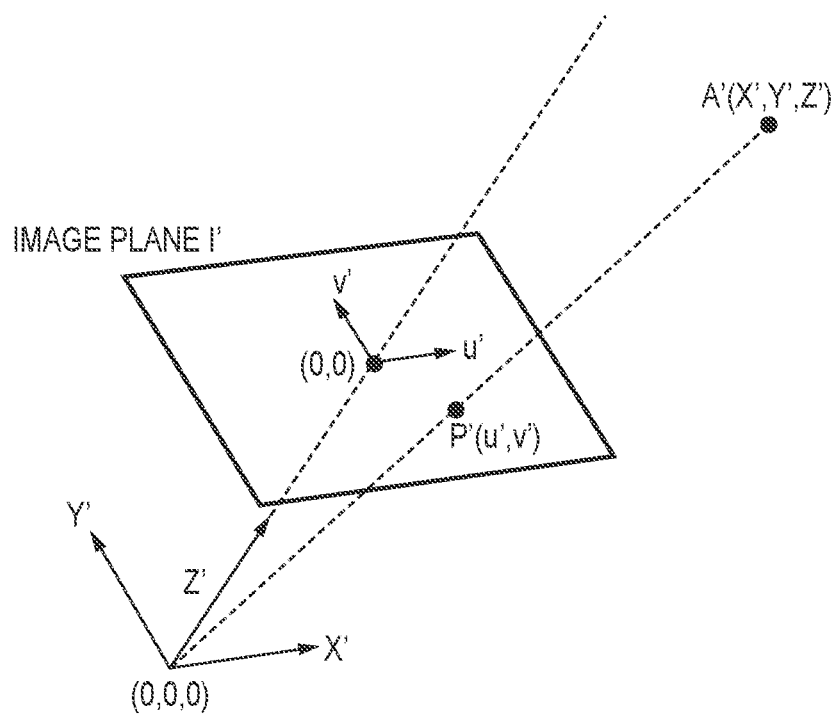

FIG. 2B shows a state where the pinhole camera model of FIG. 2A has been rotated about a rotation axis represented by the Z axis. In FIG. 2B, the X'Y'Z' spatial coordinate system is a coordinate system obtained by rotating the XYZ spatial coordinate system about the Z axis. The origin (0, 0, 0) of the X'Y'Z' spatial coordinate system coincides with that of the XYZ spatial coordinate system. That is to say, FIG. 2B depicts a state where the motion (device motion) of the video camera 100 has only angle blurring components in the roll direction, and the device motion does not have shift blurring components and angle blurring components in the yaw and pitch directions.

In FIG. 2A and FIG. 2B, there is no change in the relationship between the coordinate systems. Therefore, the origin (0, 0) in the u'v' plane coordinate system in FIG. 2B corresponds to the origin (0, 0, f) in the X'Y'Z' spatial coordinate system. Also, coordinates P' (u', v') in the u'v' plane coordinate system are coordinates obtained by projecting coordinates A' (X', Y', Z') of the subject in the X'Y'Z' spatial coordinate system onto the image plane I'. Therefore, using homogeneous coordinates, the relationship between coordinates P' and coordinates A' can be represented as (Expression 7), similarly to (Expression 6).

$$\begin{bmatrix} u' \\ v' \\ 1 \end{bmatrix} \sim \begin{bmatrix} f & 0 & 0 \\ 0 & f & 0 \\ 0 & 0 & 1 \end{bmatrix} \begin{bmatrix} X' \\ Y' \\ Z' \end{bmatrix} \quad \text{(Expression 7)}$$

Also, as coordinates A of the subject in FIG. 2A and coordinates A' of the subject in FIG. 2B have not changed (i.e., are stationary) in the world coordinate system, the relationship between coordinates A and coordinates A' can be represented as (Expression 8), provided that the roll direction components of the device motion are denoted as R.

$$\begin{bmatrix} X' \\ Y' \\ Z' \end{bmatrix} = R \begin{bmatrix} X \\ Y \\ Z \end{bmatrix} \quad \text{(Expression 8)}$$

Furthermore, (Expression 9) is obtained by substituting (Expression 6) and (Expression 7) in a transformed state into (Expression 8).

$$\begin{bmatrix} u' \\ v' \\ 1 \end{bmatrix} \sim \begin{bmatrix} f & 0 & 0 \\ 0 & f & 0 \\ 0 & 0 & 1 \end{bmatrix} R \begin{bmatrix} f & 0 & 0 \\ 0 & f & 0 \\ 0 & 0 & 1 \end{bmatrix}^{-1} \begin{bmatrix} u \\ v \\ 1 \end{bmatrix} \quad \text{(Expression 9)}$$

(Expression 9) indicates a correspondence relationship between coordinates (u, v) and coordinates (u', v') on the image plane before and after the rotation of the pinhole camera model. In other words, (Expression 9) indicates the movement of a pixel position on the image plane caused by the roll direction components of the device motion of the video camera 100. Therefore, image blurring in the roll direction can be corrected using (Expression 10), which obtains pre-rotation coordinates (u, v) from post-rotation coordinates (u', v') by transforming (Expression 9).

$$\begin{bmatrix} u \\ v \\ 1 \end{bmatrix} \sim \begin{bmatrix} f & 0 & 0 \\ 0 & f & 0 \\ 0 & 0 & 1 \end{bmatrix} R^{-1} \begin{bmatrix} f & 0 & 0 \\ 0 & f & 0 \\ 0 & 0 & 1 \end{bmatrix}^{-1} \begin{bmatrix} u' \\ v' \\ 1 \end{bmatrix} \quad \text{(Expression 10)}$$

Therefore, a projective transformation matrix H that indicates the image transformation amount for correcting image blurring in the roll direction is represented as (Expression 11).

$$H = \begin{bmatrix} f & 0 & 0 \\ 0 & f & 0 \\ 0 & 0 & 1 \end{bmatrix} R^{-1} \begin{bmatrix} f & 0 & 0 \\ 0 & f & 0 \\ 0 & 0 & 1 \end{bmatrix}^{-1} \quad \text{(Expression 11)}$$

For ease of explanation and understanding, the foregoing description has been provided under the assumption that the device motion has only the roll direction, however, also in a case where the device motion has other direction components, a similar idea can be applied by increasing the components of R. Here, provided that the yaw direction components, the pitch direction components, and the roll direction components of the device motion are θy, θp, and θr, respectively, R in the foregoing expressions can be represented as (Expression 12).

$$R = \begin{bmatrix} \cos\theta_y & 0 & -\sin\theta_y \\ 0 & 1 & 0 \\ \sin\theta_y & 0 & \cos\theta_y \end{bmatrix} \begin{bmatrix} 1 & 0 & 0 \\ 0 & \cos\theta_p & -\sin\theta_p \\ 0 & \sin\theta_p & \cos\theta_p \end{bmatrix} \quad \text{(Expression 12)}$$

$$\begin{bmatrix} \cos\theta_r & -\sin\theta_r & 0 \\ \sin\theta_r & \cos\theta_r & 0 \\ 0 & 0 & 1 \end{bmatrix}$$

Then, using (Expression 13), the projective transformation matrix H for correcting image blurring, which is represented as (Expression 11), can be decomposed into respective transformation components corresponding to translation $\vec{t}$, enlargement/reduction s (constant), rotation r (matrix), shearing k (matrix), and swinging $\vec{v}$.

$$H = \begin{bmatrix} sr & \vec{t} \\ \vec{0}^t & 1 \end{bmatrix} \begin{bmatrix} k & \vec{0} \\ \vec{0}^t & 1 \end{bmatrix} \begin{bmatrix} I & \vec{0} \\ \vec{v}^t & 1 \end{bmatrix} \quad \text{(Expression 13)}$$

-continued $$r = \begin{bmatrix} \cos\theta & -\sin\theta \\ \sin\theta & \cos\theta \end{bmatrix},$$

$$\vec{t} = \begin{bmatrix} t_x \\ t_y \end{bmatrix},$$

$$k = \begin{bmatrix} \alpha & \tan\Phi \\ 0 & 1 \end{bmatrix},$$

$$\vec{v} = \begin{bmatrix} v_x \\ v_y \end{bmatrix},$$

$$I = \begin{bmatrix} 1 & 0 \\ 0 & 1 \end{bmatrix},$$

$$\vec{0} = \begin{bmatrix} 0 \\ 0 \end{bmatrix}$$

$t_x$ . . . horizontal translation
$t_y$ . . . vertical translation
$\theta$ . . . rotation angle
$v_x$ . . . horizontal swinging
$v_y$ . . . vertical swinging
$\alpha$ . . . anisotropic scaling factor of shearing
$\varphi$ . . . direction angle of shearing (Expression 14) to (Expression 21) are obtained by solving the equations corresponding to respective transformation components based on (Expression 11) to (Expression 13).

$$t_x = f(\tan\theta_y \cos\theta_r/\cos\theta_p + \tan\theta_p \sin\theta_r) \quad \text{(Expression 14)}$$

$$t_y = f(-\tan\theta_y \sin\theta_r/\cos\theta_p + \tan\theta_p \cos\theta_r) \quad \text{(Expression 15)}$$

$$\theta = -\theta_r \quad \text{(Expression 16)}$$

$$v_x = -\tan\theta_y/f \quad \text{(Expression 17)}$$

$$v_y = -\tan\theta_p/(f\cos\theta_y) \quad \text{(Expression 18)}$$

$$s = (\cos\theta_y \cos\theta_p)^{-3/2} \quad \text{(Expression 19)}$$

$$\alpha = (\cos\theta_p/\cos\theta_y)^{1/2} \quad \text{(Expression 20)}$$

$$\tan\varphi = \sin\theta_y \sin\theta_p/(\cos\theta_y \cos\theta_p)^{1/2} \quad \text{(Expression 21)}$$

In the present embodiment, in order to reduce the processing load on the transformation amount computation circuit 200, computation is simplified as described below. Angle blurring of the video camera 100 does not become so big, except for a case where the user intentionally moves the video camera 100 during panning and the like. Therefore, when the magnitude of angle blurring of the video camera 100 (blurring angle) is $\gamma$, approximate expressions (Expression 22) to (Expression 29) corresponding to (Expression 14) to (Expression 21) are obtained through the following approximation: $\cos\gamma = 1$, $\sin\gamma \tan\gamma = 0$, $\sin\gamma \sin\gamma = 0$.

$$t_x = f \tan\theta_y \quad \text{(Expression 22)}$$

$$t_y = f \tan\theta_p \quad \text{(Expression 23)}$$

$$\theta = -\theta_r \quad \text{(Expression 24)}$$

$$v_x = -\tan\theta_y/f \quad \text{(Expression 25)}$$

$$v_y = -\tan\theta_p/f \quad \text{(Expression 26)}$$

$$s = 1 \quad \text{(Expression 27)}$$

$$\alpha = 1 \quad \text{(Expression 28)}$$

$$\tan\varphi = 0 \quad \text{(Expression 29)}$$

Here, as can be understood from (Expression 27) to (Expression 29), the scaling factor s of enlargement/reduction is 1, and the anisotropic scaling factor $\alpha$ and the direction angle $\tan\varphi$ of shearing are 1 and 0 degrees, respectively. That is to say, among transformation components of image blurring attributed to angle blurring of the video camera 100, components of enlargement/reduction and shearing are smaller than other transformation components.

Next, using FIG. 3, examples of the functional configuration and operations of the transformation amount computation circuit 200 will be described specifically. Note that the operations that will be described below as being mainly executed by a functional block included in the transformation amount computation circuit 200, are actually realized by the control circuit 101 executing the program.

Note that it is apparent from (Expression 22) and (Expression 23) that the yaw direction components $\theta_y$ of the device motion cause transformation components of translation $t_x$ in the horizontal direction and swinging $v_x$ in the horizontal direction as image blurring. It is also apparent from (Expression 25) and (Expression 26) that the pitch direction components $\theta p$ of the device motion cause transformation components of translation $t_y$ in the vertical direction and swinging $v_y$ in the vertical direction as image blurring.

The same type of transformation components that have different directions can be corrected by the same processing. Therefore, the following description will be provided in connection with only correction processing for transformation components in one direction.

Figure 3:
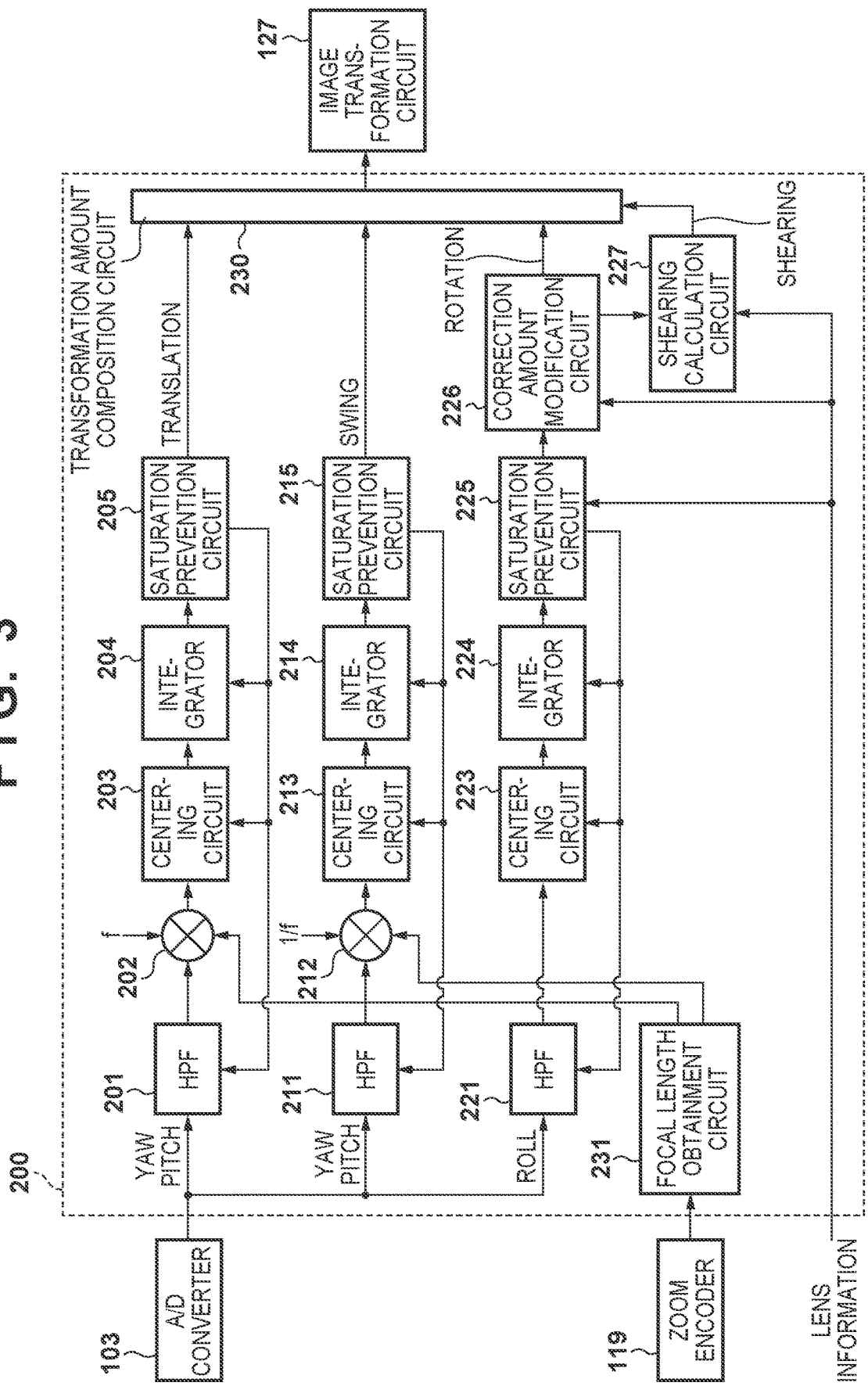
FIG. 3 is a block diagram showing an exemplary functional configuration of a transformation amount computation unit of FIG. 1.

In FIG. 3, blocks with reference numerals 201 to 205 calculate a correction amount for translation transformation components of image blurring. Blocks with reference numerals 211 to 215 calculate a correction amount for swing transformation components of image blurring. Also, blocks with reference numerals 221 and 223 to 226 calculate a correction amount for rotation transformation components of image blurring. When the anamorphic lens is included, a block with reference numeral 227 calculates a correction amount for shearing transformation components, which is for accurate image transformation in a case where the rotation transformation components have been corrected.

First, the calculation of the correction amount for translation transformation components will be described. Among the output from the A/D converter 103, data of the angular velocity in the yaw direction or the pitch direction is supplied to an HPF 201. The HPF 201 outputs a signal in a high-frequency band by blocking low-frequency components included in the data of the angular velocity. A cutoff frequency of the HPF 201 can be, for example, preset experimentally. Also, the cutoff frequency of the HPF 201 may be variable. Note that the HPF 201 is not indispensable, and the output from the A/D converter 103 may be supplied directly to a multiplier 202.

A focal length obtainment circuit 231 obtains the focal length f of the image capture optical system 120 based on the zoom position output from the zoom encoder 119. The focal length obtainment circuit 231 outputs the obtained focal length f to the multiplier 202 and a divider 212. The method of obtaining the focal length from the zoom position is not limited in a particular way, and any known method may be used. For example, the relationship between the zoom position and the focal length can be held as a function or a table, and the focal length can be obtained by substituting the zoom position into the function, or by referring to the table with use of the zoom position. Information for obtaining the focal length from the zoom position, such as a function and a table, may be obtained from the image capture optical system 120. Also, when the zoom encoder 119 can directly output the focal length, the focal length obtainment circuit 231 is unnecessary.

The multiplier 202 multiplies the output from the HPF 201 by the focal length f output from the focal length obtainment circuit 231, and supplies the result of the multiplication to a centering circuit 203.

When a motion of the video camera 100 in the yaw direction or the pitch direction exceeds a certain amount, the centering circuit 203 adds, to the output from the multiplier 202, an input value for restoring the blurring correction amount to zero (hereinafter referred to as a centering amount). The magnitude of the centering amount may be variable. Note that the centering circuit 203 is not indispensable, and the output from the multiplier 202 may be supplied directly to an integrator 204.

The integrator 204 integrates the output from the centering circuit 203, and supplies the integrated value to a saturation prevention circuit 205. The time constant of the integrator 204 may be variable.

The saturation prevention circuit 205 restricts the integrated value supplied from the integrator 204 from exceeding a predetermined threshold. For example, when the difference between the integrated value and the threshold becomes smaller than a predetermined value, the saturation prevention circuit 205 restricts the integrated value from increasing. The saturation prevention circuit 205 restricts the integrated value from increasing by, for example, executing one or more of (1) increasing of the cutoff frequency of the HPF 201, (2) reducing of the time constant of the integrator 204, and (3) increasing of the centering amount of the centering circuit 203. Note that when the output from the integrator 204 exceeds the threshold even though the foregoing control has been performed, the saturation prevention circuit 205 outputs a value that is equal to the threshold. The output from the saturation prevention circuit 205 is supplied to a transformation amount composition circuit 230 as the correction amount for translation transformation components of image blurring.

Next, the calculation of the correction amount for swing transformation components will be described. The blocks with reference numerals 211 to 215, which calculate the correction amount for swing transformation components, perform the same processing as the blocks with reference numerals 201 to 205, respectively, except for processing of the multiplier 202 and the divider 212. Therefore, only the divider 212 will be described, and the description of the blocks 211 and 212 to 215 are omitted.

The divider 212 divides the output from the HPF 211 by the focal length f output from the focal length obtainment circuit 231, and supplies the result of the division to a centering circuit 213. The divider 212 may be a multiplier that performs multiplication by a reciprocal 1/f for the focal length f. The division by the focal length f is based on the expressions for calculating swing transformation components, which are represented as (Expression 25) and (Expression 26). The output from a saturation prevention circuit 215 is supplied to the transformation amount composition circuit 230 as the correction amount for swing transformation components of image blurring.

Next, the calculation of the correction amount for rotation transformation components will be described. Among the output from the A/D converter 103, data of the angular velocity in the roll direction is supplied to an HPF 221. The HPF 221 outputs a signal in a high-frequency band by blocking low-frequency components included in the data of the angular velocity. A cutoff frequency of the HPF 221 can be, for example, preset experimentally. Also, the cutoff frequency of the HPF 221 may be variable. Note that the HPF 221 is not indispensable, and the output from the A/D converter 103 may be supplied directly to a centering circuit 223.

When a motion of the video camera 100 in the roll direction exceeds a certain amount, the centering circuit 223 adds a centering amount to the output from the HPF 221, similarly to the centering circuits 203, 213. Note that the centering circuit 223 is not indispensable, and the output from the HPF 221 or the A/D converter 103 may be supplied directly to an integrator 224.

The integrator 224 integrates the output from the centering circuit 203, and supplies the integrated value to a saturation prevention circuit 225.

The saturation prevention circuit 225 restricts the integrated value supplied from the integrator 224 from exceeding a predetermined threshold. For example, when the difference between the integrated value and the threshold becomes smaller than a predetermined value, the saturation prevention circuit 225 restricts the integrated value from increasing. The saturation prevention circuit 225 restricts the integrated value from increasing by, for example, executing one or more of (1) increasing of the cutoff frequency of the HPF 221, (2) reducing of the time constant of the integrator 224, and (3) increasing of the centering amount of the centering circuit 223. Note that when the output from the integrator 224 exceeds the threshold even though the foregoing control has been performed, the saturation prevention circuit 225 outputs a value that is equal to the threshold.

The saturation prevention circuit 225 changes the threshold for the integrated value depending on whether the anamorphic lens is mounted on the video camera 100. The threshold that depends on whether the anamorphic lens is mounted can be preset. The output from the saturation prevention circuit 225 is supplied to a correction amount modification circuit 226.

When the anamorphic lens is mounted on the video camera 100, the correction amount modification circuit 226 modifies the correction amount for rotation transformation components in accordance with the compression ratio of the anamorphic lens. The method of modifying the correction amount will be described later in detail. The output from the correction amount modification circuit 226 is supplied not only to the transformation amount composition circuit 230, but also to a shearing calculation circuit 227, as the correction amount for rotation transformation components.

The shearing calculation circuit 227 calculates a correction amount for shearing, which is for accurate transformation of the subject image in correction of rotation transformation components in a case where the anamorphic lens is mounted on the video camera 100. The calculation of the correction amount for shearing will be described later in detail. The output from the shearing calculation circuit 227 is supplied to the transformation amount composition circuit 230 as a shearing correction amount.

The transformation amount composition circuit 230 composites together the correction amounts for respective transformation components of image blurring that have been supplied from the saturation prevention circuits 205 and 215, the correction amount modification circuit 226, and the shearing calculation circuit 227. Specifically, the transformation amount composition circuit 230 calculates the projective transformation matrix of (Expression 1) in accordance with (Expression 13). The transformation amount composition circuit 230 outputs (sets) the values of respective elements in the calculated projective transformation matrix to (on) the image transformation circuit 127. The image transformation circuit 127 corrects image blurring by applying, to image data, geometric transformation that uses the projective transformation matrix set by the transformation amount composition circuit 230.

Figure 4A:
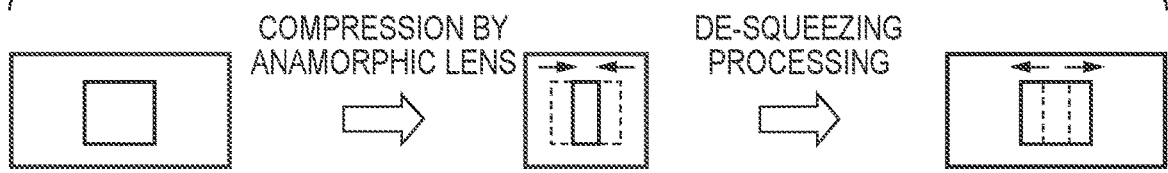
FIG. 4A to FIG. 4D are schematic diagrams related to image transformation caused by compression processing and de-squeezing processing when an anamorphic lens is mounted, and a correction method therefor.

Next, a description is given of image transformation caused by the anamorphic lens, and a projective transformation matrix that indicates the image transformation. FIG. 4A is a diagram schematically showing image transformation that occurs in a procedure in which a subject image is compressed (squeezed) by the anamorphic lens in the horizontal direction of the image plane, the subject image is recorded, the subject image is decompressed (de-squeezed) in the horizontal direction after shooting, and then the subject image is reproduced. The following describes an exemplary case where there is one square subject located in front of the camera in a shooting range. For example, provided that the compression ratio of the anamorphic lens in the horizontal direction is ½ (no compression in the vertical direction), the size of the subject image formed on the image plane is compressed to ½ in the horizontal direction, and thus the square subject is recorded as an image that has been transformed into a vertically long rectangle. By performing de-squeezing processing for stretching the image twofold in the horizontal direction at the time of reproduction, the effects of compression performed by the anamorphic lens is removed, and the shape of the subject reverts to a square.

Provided that the anamorphic lens has a compression ratio of a (<1) in the horizontal direction and a compression ratio of 1 (no compression) in the horizontal direction, image transformation caused by the anamorphic lens can be represented as a projective transformation matrix of (Expression 30).

$$\begin{bmatrix} u' \\ v' \\ 1 \end{bmatrix} = \begin{bmatrix} a & 0 & 0 \\ 0 & 1 & 0 \\ 0 & 0 & 1 \end{bmatrix} \begin{bmatrix} u \\ v \\ 1 \end{bmatrix} \quad \text{(Expression 30)}$$

Note that in the case of compression to ½, the compression ratio a is 0.5. The compression ratio a of the anamorphic lens is not limited in a particular way, although it is generally 0.5 or 0.75. Furthermore, compression may be performed also in the vertical direction. The compression ratio (or a scale ratio represented by a reciprocal for the compression ratio) of the anamorphic lens can be obtained by the control circuit 101 from a lens unit, or set by the user.

As shown in FIG. 4A, the image that has been shot using the anamorphic lens and recorded can be restored to the image without transformation by removing the effect of compression through the de-squeezing processing. The de-squeezing processing for the image that has been recorded at the compression ratio a can be represented as a projective transformation matrix of (Expression 31).

$$\begin{bmatrix} u'' \\ v'' \\ 1 \end{bmatrix} = \begin{bmatrix} 1/a & 0 & 0 \\ 0 & 1 & 0 \\ 0 & 0 & 1 \end{bmatrix} \begin{bmatrix} u' \\ v' \\ 1 \end{bmatrix} \quad \text{(Expression 31)}$$

From (Expression 30) and (Expression 31), it is apparent that (u", v")=(u, v), which means that restoration to the original coordinates without compression and transformation is possible.

Figure 4B:
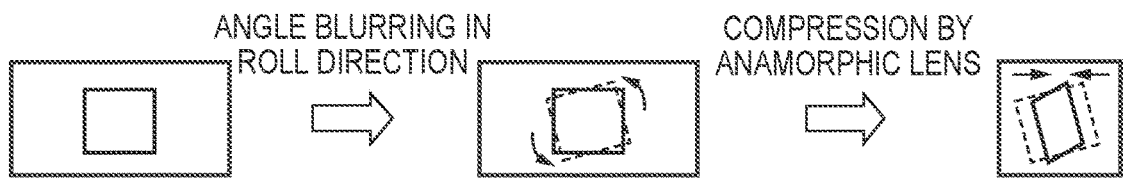

Next, assume a case where the video camera 100 has experienced angle blurring in the roll direction while shooting in a state where the anamorphic lens is mounted on the video camera 100. FIG. 4B schematically shows a subject image that is formed by the anamorphic lens on the image plane when the video camera 100 has experienced angle blurring in the roll direction.

Provided that a shooting scene of the present case is similar to that of FIG. 4A, as a subject image is formed while being compressed in the horizontal direction of the image plane in a state where a subject is rotated, the square subject is recorded as an image of a parallelogram. A projective transformation matrix that indicates this image transformation can be represented as a combination of a projective transformation matrix indicating angle blurring in the roll direction and the projective transformation matrix of image transformation caused by the anamorphic lens (Expression 31).

Provided that angle blurring in the roll direction is θr, this can be represented as the projective transformation matrix of the third term in the right side of (Expression 12). This is combined with the projective transformation matrix of image transformation caused by the anamorphic lens (Expression 31); as a result, image transformation caused by angle blurring at the time of shooting that uses the anamorphic lens can be represented as a projective transformation matrix of (Expression 32).

$$\begin{bmatrix} u' \\ v' \\ 1 \end{bmatrix} = \begin{bmatrix} a & 0 & 0 \\ 0 & 1 & 0 \\ 0 & 0 & 1 \end{bmatrix} \begin{bmatrix} \cos\theta r & -\sin\theta r & 0 \\ \sin\theta r & \cos\theta r & 0 \\ 0 & 0 & 1 \end{bmatrix} \begin{bmatrix} u \\ v \\ 1 \end{bmatrix} \quad \text{(Expression 32)}$$

Here, in order to correct the rotation transformation in the roll direction, assume a projective transformation matrix H of (Expression 33) with a rotation angle (-θr).

$$H = \begin{bmatrix} \cos(-\theta r) & -\sin(-\theta r) & 0 \\ \sin(-\theta r) & \cos(-\theta r) & 0 \\ 0 & 0 & 1 \end{bmatrix} \quad \text{(Expression 33)}$$

If the rotation transformation with θr is corrected simply by applying the projective transformation matrix H of (Expression 33) to (Expression 32), (Expression 34) is yielded.

$$\begin{bmatrix} u'' \\ v'' \\ 1 \end{bmatrix} = \begin{bmatrix} 1/a & 0 & 0 \\ 0 & 1 & 0 \\ 0 & 0 & 1 \end{bmatrix} H \begin{bmatrix} u' \\ v' \\ 1 \end{bmatrix}$$

$$= \begin{bmatrix} 1/a & 0 & 0 \\ 0 & 1 & 0 \\ 0 & 0 & 1 \end{bmatrix} \begin{bmatrix} \cos(-\theta r) & -\sin(-\theta r) & 0 \\ \sin(-\theta r) & \cos(-\theta r) & 0 \\ 0 & 0 & 1 \end{bmatrix} \quad \text{(Expression 34)}$$

$$\begin{bmatrix} a & 0 & 0 \\ 0 & 1 & 0 \\ 0 & 0 & 1 \end{bmatrix} \begin{bmatrix} \cos\theta r & -\sin\theta r & 0 \\ \sin\theta r & \cos\theta r & 0 \\ 0 & 0 & 1 \end{bmatrix} \begin{bmatrix} u \\ v \\ 1 \end{bmatrix}$$

$$= \begin{bmatrix} 1/a & 0 & 0 \\ 0 & 1 & 0 \\ 0 & 0 & 1 \end{bmatrix} \begin{bmatrix} a\cdot\cos^2\theta r + \sin^2\theta r & (1-a)\cdot\sin\theta r\cos\theta r & 0 \\ (1-a)\cdot\sin\theta r\cos\theta r & a\cdot\sin^2\theta r + \cos^2\theta r & 0 \\ 0 & 0 & 1 \end{bmatrix}$$

$$\begin{bmatrix} u \\ v \\ 1 \end{bmatrix}$$

In (Expression 34) also, (u″, v″) denotes coordinates on an image after de-squeezing processing, similarly to (Expression 31). It is apparent from (Expression 34) that, even if de-squeezing processing is applied to the image obtained by correcting the rotation transformation, the shape of the subject does not revert to a square and remains distorted.

Figure 4C:
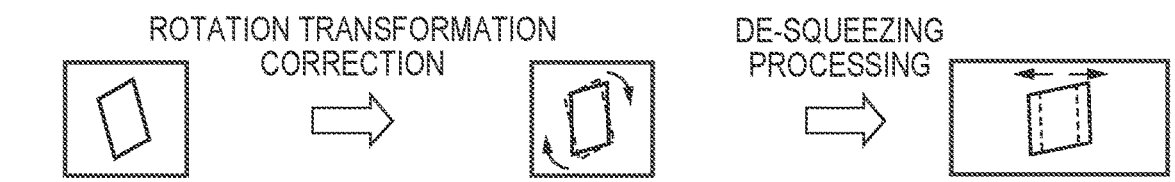

FIG. 4C is a diagram schematically showing the problem that occurs when the rotation transformation has been corrected using (Expression 34) and de-squeezing processing has been performed. As shown therein, it is apparent that the problem cannot be addressed by normal rotation transformation correction when the subject image that has been compressed by the anamorphic lens has been transformed due to angle blurring.

In view of this, in the present embodiment, image blurring that is caused by angle blurring in the roll direction when the anamorphic lens is mounted is accurately corrected with use of rotation transformation correction in the roll direction and shearing processing in consideration of the compression ratio of the anamorphic lens.

$$H = \begin{bmatrix} B & B\cdot\tan(\gamma-\Phi) & 0 \\ 0 & 1/B & 0 \\ 0 & 0 & 1 \end{bmatrix} \begin{bmatrix} \cos(-\Phi) & -\sin(-\Phi) & 0 \\ \sin(-\Phi) & \cos(-\Phi) & 0 \\ 0 & 0 & 1 \end{bmatrix} \quad \text{(Expression 35)}$$

$$\tan\Phi = 1/a\cdot\tan\theta r \quad \text{(Expression 36)}$$

$$\tan\gamma = a\cdot\tan\theta r \quad \text{(Expression 37)}$$

$$B = \cos\Phi/\cos\theta r \quad \text{(Expression 38)}$$

Here, parameters Φ, γ, and B in (Expression 35) are values that are respectively denoted as (Expression 36), (Expression 37), and (Expression 38) with use of the compression ratio a of the anamorphic lens and the rotation angle θr of angle blurring in the roll direction. The projective transformation matrix of (Expression 35) can be transformed into the following (Expression 39).

$$H = \begin{bmatrix} B & B\cdot\tan(\gamma-\Phi) & 0 \\ 0 & 1/B & 0 \\ 0 & 0 & 1 \end{bmatrix} \begin{bmatrix} \cos(-\Phi) & -\sin(-\Phi) & 0 \\ \sin(-\Phi) & \cos(-\Phi) & 0 \\ 0 & 0 & 1 \end{bmatrix} \quad \text{(Expression 39)}$$

$$= \begin{bmatrix} \cos\Phi/\cos\theta r & \cos\Phi/\cos\theta r\cdot\tan(\gamma-\Phi) & 0 \\ 0 & \cos\theta r/\cos\Phi & 0 \\ 0 & 0 & 1 \end{bmatrix} \begin{bmatrix} \cos\Phi & \sin\Phi & 0 \\ -\sin\Phi & \cos\Phi & 0 \\ 0 & 0 & 1 \end{bmatrix}$$

$$= \begin{bmatrix} \cos\Phi/\cos\theta r\cdot(\cos\Phi - \sin\Phi\cdot\tan(\gamma-\Phi)) & \cos\Phi/\cos\theta r\cdot(\sin\Phi - \cos\Phi\cdot\tan(\gamma-\Phi)) & 0 \\ -\cos\theta r\cdot\sin\Phi/\cos\Phi & \cos\theta r\cdot\cos\Phi/\cos\Phi & 0 \\ 0 & 0 & 1 \end{bmatrix}$$

$$\ldots$$

$$= \begin{bmatrix} \cos\theta r & a\cdot\sin\theta r & 0 \\ -1/a\cdot\sin\theta r & \cos\theta r & 0 \\ 0 & 0 & 1 \end{bmatrix}$$

Figure 4D:
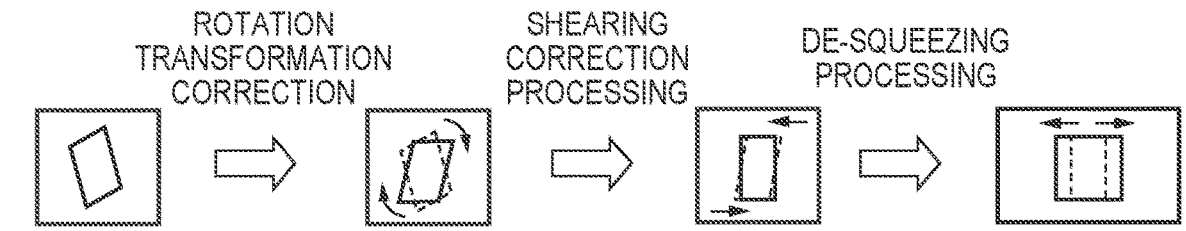

FIG. 4D is a diagram schematically showing a correction method of the present embodiment. As can be understood from comparison with FIG. 4C, after the rotation transformation attributed to angle blurring in the roll direction is corrected, shearing correction processing is applied before de-squeezing processing; in this way, image blurring can be accurately corrected.

The following describes a projective transformation matrix that realizes the correction processing shown in FIG. 4D. In consideration of distortion of a subject image caused by compression performed by the anamorphic lens, a projective transformation matrix based on rotation correction and shearing, which is shown in (Expression 35), is used.

(Expression 39) is the same as a projective transformation matrix of (Expression 40), which corrects distortion of a subject image caused by the anamorphic lens by firstly applying image transformation similar to de-squeezing processing, then corrects the rotation transformation with the rotation angle θr, and applies transformation caused by the anamorphic lens again. That is to say, the projective transformation matrix of (Expression 35) is equivalent to processing for correcting rotation transformation caused by angle blurring in a state where the compression performed by the anamorphic lens is cancelled out, and thereafter applying transformation equivalent to the compression performed by the anamorphic lens.

$$H = \begin{bmatrix} a & 0 & 0 \\ 0 & 1 & 0 \\ 0 & 0 & 1 \end{bmatrix} \begin{bmatrix} \cos(-\theta r) & -\sin(-\theta r) & 0 \\ \sin(-\theta r) & \cos(-\theta r) & 0 \\ 0 & 0 & 1 \end{bmatrix} \begin{bmatrix} 1/a & 0 & 0 \\ 0 & 1 & 0 \\ 0 & 0 & 1 \end{bmatrix}$$ (Expression 40)

$$= \begin{bmatrix} a & 0 & 0 \\ 0 & 1 & 0 \\ 0 & 0 & 1 \end{bmatrix} \begin{bmatrix} 1/a \cdot \cos\theta r & \sin\theta r & 0 \\ -1/a \cdot \sin\theta r & \cos\theta r & 0 \\ 0 & 0 & 1 \end{bmatrix}$$

$$= \begin{bmatrix} \cos\theta r & a \cdot \sin\theta r & 0 \\ -1/a \cdot \sin\theta r & \cos\theta r & 0 \\ 0 & 0 & 1 \end{bmatrix}$$

Using the projective transformation matrix of (Expression 39), coordinate transformation that encompasses de-squeezing processing can be denoted as (Expression 41).

$$\begin{bmatrix} u'' \\ v'' \\ 1 \end{bmatrix} = \begin{bmatrix} 1/a & 0 & 0 \\ 0 & 1 & 0 \\ 0 & 0 & 1 \end{bmatrix} H \begin{bmatrix} u' \\ v' \\ 1 \end{bmatrix}$$

$$= \underbrace{\begin{bmatrix} 1/a & 0 & 0 \\ 0 & 1 & 0 \\ 0 & 0 & 1 \end{bmatrix}}_{(5)} \underbrace{\begin{bmatrix} B & B \cdot \tan(\gamma - \Phi) & 0 \\ 0 & 1/B & 0 \\ 0 & 0 & 1 \end{bmatrix}}_{(4)} \underbrace{\begin{bmatrix} \cos(-\Phi) & -\sin(-\Phi) & 0 \\ \sin(-\Phi) & \cos(-\Phi) & 0 \\ 0 & 0 & 1 \end{bmatrix}}_{(3)}$$

$$\underbrace{\begin{bmatrix} a & 0 & 0 \\ 0 & 1 & 0 \\ 0 & 0 & 1 \end{bmatrix}}_{(2)} \underbrace{\begin{bmatrix} \cos\theta r & -\sin\theta r & 0 \\ \sin\theta r & \cos\theta r & 0 \\ 0 & 0 & 1 \end{bmatrix}}_{(1)} \begin{bmatrix} u \\ v \\ 1 \end{bmatrix}$$

$$= \begin{bmatrix} 1/a & 0 & 0 \\ 0 & 1 & 0 \\ 0 & 0 & 1 \end{bmatrix} \begin{bmatrix} \cos\theta r & a \cdot \sin\theta r & 0 \\ -1/a \cdot \sin\theta r & \cos\theta r & 0 \\ 0 & 0 & 1 \end{bmatrix}$$

$$\begin{bmatrix} a \cdot \cos\theta r & -a \cdot \sin\theta r & 0 \\ \sin\theta r & \cos\theta r & 0 \\ 0 & 0 & 1 \end{bmatrix} \begin{bmatrix} u \\ v \\ 1 \end{bmatrix}$$

$$= \begin{bmatrix} 1/a & 0 & 0 \\ 0 & 1 & 0 \\ 0 & 0 & 1 \end{bmatrix} \begin{bmatrix} a & 0 & 0 \\ 0 & 1 & 0 \\ 0 & 0 & 1 \end{bmatrix} \begin{bmatrix} u \\ v \\ 1 \end{bmatrix}$$

(Expression 41)

The meaning of each matrix in the second row of (Expression 41) is as follows.

(1): Angle blurring in the roll direction that is applied to the video camera 100 (rotation angle: θr)

(2): Compression in the horizontal direction performed by the anamorphic lens (compression ratio: a)

(3) Correction of rotation transformation caused by angle blurring in the roll direction (rotation angle: Φ, where tan Φ=1/a·tan θr)

(4): Shearing processing (the anisotropic scaling factor of shearing: B=cos Φ/cos θr, the direction angle of shearing: δ−Φ, where tan γ=a·tan θr).

(5): De-squeezing processing (the enlargement ratio in the horizontal direction: 1/a)

It is apparent from the result of (Expression 41) that (u", v")=(u, v), which means that image blurring is accurately corrected. In this way, even in a state where angle blurring in the roll direction has occurred during shooting when the anamorphic lens is mounted, the application of (3) rotation transformation correction and (4) shearing processing makes it possible to obtain an image after de-squeezing processing in which image blurring has been appropriately corrected.

When the anamorphic lens is mounted on the video camera 100, the transformation amount computation circuit 200 calculates the projective transformation matrix of (Expression 1) with use of the matrix of (3) in (Expression 41) as the rotation transformation components r of (Expression 13), and the matrix of (4) in (Expression 41) as the shearing transformation components k.

Also, when the anamorphic lens is not mounted on the video camera 100, the transformation amount computation circuit 200 calculates the projective transformation matrix of (Expression 1) by using (Expression 13) as is.

For ease of explanation and understanding, the present embodiment has been described in relation to a case where the anamorphic lens compresses a subject image only in the horizontal direction of the image plane. However, even in a case where the anamorphic lens compresses a subject image in the vertical direction, and a case where a subject image is compressed at different compression ratios in the horizontal and vertical directions, the present embodiment is applicable as long as similar correction is performed for each of the compression directions.

As described above, the present embodiment performs rotation transformation correction in the roll direction and shearing processing in consideration of compression performed by the anamorphic lens. In this way, appropriate image blurring correction can be realized even when a device motion around the optical axis has occurred at the time of shooting while a lens that forms a rotationally asymmetric image, such as an anamorphic lens, is mounted.

Note, although shearing correction processing is performed in the leftward and rightward directions after performing rotation transformation correction so that the two (upper and lower) sides of a square subject become parallel to the horizontal direction of an image according to FIG. 4D, other rotation transformation correction and shearing correction processing may be performed. For example, shearing correction processing may be performed in the upward and downward directions after performing rotation transformation correction so that the two (left and right) sides of the square subject become parallel to the vertical direction of the image.

Furthermore, the present invention is also applicable to a case where the anamorphic lens is replaced by an optical system with an advantageous effect whereby a subject image is compressed in the direction parallel to the short sides of the pixel array in the image sensor 123. In addition, the present invention is also applicable to a case where an optical system with the following advantageous effect is used: a subject image is compressed in the directions parallel to the short sides and the long sides of the pixel array in the image sensor 123, but the compression ratio in the direction parallel to the short sides is different from the compression ratio in the direction parallel to the long sides. That is to say, the present invention is applicable to a case where an optical system with the following advantageous effect is used: a subject image is compressed in at least one of a first direction and a second direction that are orthogonal to the optical axis, and compression in the first direction is relatively larger than compression in the second direction (the compression ratio differs between the first direction and the second direction).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-046839, filed on Mar. 17, 2020, which is hereby incorporated by reference herein in its entirety.

What is claimed is:

1. An image processing apparatus that corrects image blurring with respect to image data that has been captured using a lens that forms a subject image which has been compressed in at least one of a first direction and a second direction that are orthogonal to an optical axis and in which compression in the first direction is larger than compression in the second direction, the image blurring being attributed to a device motion around the optical axis of the lens, the image processing apparatus comprising:
an image transformation circuit that applies geometric transformation processing to the image data based on first information related to a compression ratio of a subject image applied by the lens and on second information related to a rotation angle of the device motion,
wherein the geometric transformation processing includes correction processing for rotation transformation of the subject image attributed to the device motion around the optical axis, and shearing processing.

2. The image processing apparatus according to claim 1, wherein
the first direction is a direction parallel to long sides of a pixel array in an image sensor.

3. The image processing apparatus according to claim 1, wherein
the correction processing for rotation transformation is denoted as $$\begin{bmatrix} \cos(-\Phi) & -\sin(-\Phi) & 0 \\ \sin(-\Phi) & \cos(-\Phi) & 0 \\ 0 & 0 & 1 \end{bmatrix},$$

where tan $\Phi=1/a \cdot \tan \theta r$, provided that the compression ratio is a and the rotation angle of the device motion is $\theta r$.

4. The image processing apparatus according to claim 1, wherein
the shearing processing is denoted as $$\begin{bmatrix} B & B \cdot \tan(\gamma - \Phi) & 0 \\ 0 & 1/B & 0 \\ 0 & 0 & 1 \end{bmatrix},$$

where B is $\cos \theta/\cos \theta r$, $(\beta-\Phi)$ is a direction angle of shearing, tan $\gamma = a \cdot \tan \theta r$, and a is the compression ratio.

5. The image processing apparatus according to claim 1, further comprising:
a de-squeezing processing circuit that performs de-squeezing processing when image data output from the image transformation circuit is reproduced.

6. The image processing apparatus according to claim 1, further comprising:
an obtainment circuit that obtains the first information.

7. The image processing apparatus according to claim 6, wherein
the obtainment circuit obtains the first information in response to a user operation on an operation member.

8. An image capture apparatus, comprising:
an image sensor;
a motion detection circuit that outputs a signal indicating a motion of the image capture apparatus; and
an image processing apparatus that corrects image blurring with respect to image data that has been captured using the image sensor and a lens that forms a subject image which has been compressed in at least one of a first direction and a second direction that are orthogonal to an optical axis and in which compression in the first direction is larger than compression in the second direction, the image blurring being attributed to the motion of the image capture apparatus around the optical axis of the lens, wherein the image processing apparatus
applies geometric transformation processing to the image data based on first information related to a compression ratio of a subject image applied by the lens and on second information related to a rotation angle of the motion of the image capture apparatus, and obtains the second information from the motion detection circuit.

9. The image capture apparatus according to claim 8, wherein
the first direction is a direction parallel to long sides of a pixel array in the image sensor.

10. The image capture apparatus according to claim 8, wherein
the correction processing for rotation transformation is denoted as $$\begin{bmatrix} \cos(-\Phi) & -\sin(-\Phi) & 0 \\ \sin(-\Phi) & \cos(-\Phi) & 0 \\ 0 & 0 & 1 \end{bmatrix},$$

where $\tan \Phi = 1/a \cdot \tan \theta r$, provided that the compression ratio is a and the rotation angle of the device motion is $\theta r$.

11. The image capture apparatus according to claim 8, wherein
the shearing processing is denoted as $$\begin{bmatrix} B & B \cdot \tan(\gamma - \Phi) & 0 \\ 0 & 1/B & 0 \\ 0 & 0 & 1 \end{bmatrix},$$

where B is $\cos \theta / \cos \theta r$, $(\delta - \Phi)$ is a direction angle of shearing, $\tan \gamma = a \cdot \tan \theta r$, and a is the compression ratio.

12. The image capture apparatus according to claim 8, further comprising:
a de-squeezing processing circuit that performs de-squeezing processing when image data output from the image transformation circuit is reproduced.

13. The image capture apparatus according to claim 8, further comprising:
an obtainment circuit that obtains the first information.

14. The image capture apparatus according to claim 13, wherein
the obtainment circuit obtains the first information in response to a user operation on an operation member.

15. The image capture apparatus according to claim 8, wherein
the lens is attachable to and removable from the image capture apparatus.

16. An image processing method executed by an image processing apparatus that corrects image blurring with respect to image data that has been captured using a lens that forms a subject image which has been compressed in at least one of a first direction and a second direction that are orthogonal to an optical axis and in which compression in the first direction is larger than compression in the second direction, the image blurring being attributed to a device motion around the optical axis of the lens, the image processing method comprising:
applying geometric transformation processing to the image data based on first information related to a compression ratio of a subject image applied by the lens and on second information related to a rotation angle of the device motion,
wherein the applying includes
applying correction processing for rotation transformation of the subject image attributed to the device motion around the optical axis, and
applying shearing processing.

* * * * *